United States Patent
Lin et al.

(10) Patent No.: US 10,606,083 B2
(45) Date of Patent: Mar. 31, 2020

(54) PERSPIRATION DISSIPATING SUPPORT ASSEMBLY FOR HEAD-MOUNTED DISPLAY DEVICES

(71) Applicant: Microsoft Technology Licensing, LLC, Redmond, WA (US)

(72) Inventors: Tzu-Yuan Lin, San Jose, CA (US); Brian J. Toleno, Cupertino, CA (US); Igor Markovsky, San Jose, CA (US); Erin Elizabeth Hurbi, San Francisco, CA (US); Michael Nikkhoo, Saratoga, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 148 days.

(21) Appl. No.: 15/965,631

(22) Filed: Apr. 27, 2018

(65) Prior Publication Data

US 2019/0331928 A1    Oct. 31, 2019

(51) Int. Cl.
*G02B 27/01* (2006.01)
*G02C 11/08* (2006.01)
*D03D 25/00* (2006.01)

(52) U.S. Cl.
CPC .......... *G02B 27/0176* (2013.01); *G02C 11/08* (2013.01); *B32B 2266/06* (2013.01); *B32B 2307/724* (2013.01); *D03D 25/005* (2013.01)

(58) Field of Classification Search
CPC .... G02C 11/08; G02B 27/0176; G02B 7/002; D03D 25/005; B32B 2307/724; B32B 2266/06
See application file for complete search history.

(56) References Cited

U.S. PATENT DOCUMENTS

| 9,717,958 B1 | 8/2017 | Tran et al. |
| 2010/0198322 A1* | 8/2010 | Joseph .................... A61F 7/007 607/108 |

(Continued)

FOREIGN PATENT DOCUMENTS

WO    2014082023 A1    5/2014

OTHER PUBLICATIONS

"Oculus Rift VR Cover", Retrieved from: «https://vrcover.com/product/oculus-rift-vr-cover-nosefree/», Retrieved on: Aug. 18, 2017, 5 Pages.

(Continued)

*Primary Examiner* — Abbas I Abdulselam
(74) *Attorney, Agent, or Firm* — Newport IP, LLC; Mike R. Cicero

(57) ABSTRACT

A perspiration dissipating support assembly for head-mounted-display (HMD) devices. Variations of the perspiration dissipating support assembly disclosed herein enable supporting forces for an HMD device to be spread over a large portion of a user's head while facilitating dissipation of both liquid perspiration and vapor perspiration via respective dedicated dissipation mechanisms. In some embodiments, the perspiration dissipating support assembly includes a vapor-permeable contact layer that contacts the user's head and a vapor-permeable spacer that provides a Moisture Vapor Transmission Rate on the order of several times greater than that of the vapor-permeable contact layer. The vapor-permeable contact layer may have wicking properties that tend to draw perspiration (e.g., via capillary action resulting from a particular technical-weave pattern) away from the user's head and into the vapor-permeable spacer through which the perspiration evaporates into the ambient environment. The vapor-permeable spacer may be a three-dimensional fabric and/or an open-cell foam.

20 Claims, 6 Drawing Sheets

(56) References Cited

U.S. PATENT DOCUMENTS

2013/0278631 A1    10/2013  Border et al.
2015/0219901 A1*    8/2015  Morimoto ............ G02B 27/017
                                                         345/8
2015/0268721 A1     9/2015  Joo
2016/0004085 A1     1/2016  Stroetmann
2016/0212879 A1*    7/2016  Nikkhoo ............ H05K 7/20127
2016/0381832 A1    12/2016  Hurbi et al.

OTHER PUBLICATIONS

"Realwear", Retrieved from: «https://web.archive.org/web/20161113013443/https:/realwear.com/hmt-1/», Nov. 13, 2016, 6 Pages.

"Virtual Reality Headset Hygiene: Solving the VR Headset Hygiene Issue", Retrieved from: «https://htcvive.wordpress.com/2016/03/10/virtual-reality-headset-hygiene-solving-the-vr-headset-hygiene-issue/», Mar. 10, 2016, 3 Pages.

Arnesto, Osmond, "HMD Hygiene 101 for VR Fitness Gaming", Retrieved from: «https://www.vrfitnessinsider.com/hmd-hygiene-101-for-vr-fitness-gaming/», Jun. 22, 2017, 4 Pages.

Tye, Robert, "ViveNchill: A 'cool' Solution for Your HTC Vive Headset", Retrieved from: «https://www.indiegogo.com/projects/vivenchill-vr#/», Retrieved on: Aug. 11, 2017, 3 Pages.

\* cited by examiner

PERSPIRATION DISSIPATING SUPPORT ASSEMBLY FOR HEAD-MOUNTED DISPLAY DEVICES

BACKGROUND

Perspiration management poses unique challenges in the design of Head-Mounted-Display (HMD) devices such as, for example, Augmented-Reality (AR) headsets since these devices are physically supported by a user's head during operation. For example, providing supporting forces that are adequate to maintain an HMD device in an optimal position while simultaneously limiting the amount of pressure exerted on the user's head during operation encourages designers to increase the size of support pads on the HMD device. This is because as the size of the support pads is increased to cover a larger area of the user's head, the amount of pressure (i.e., force per unit-area) that is exerted on the user from the weight of the device decreases proportionally. Unfortunately, increasing the size of these support pads inhibits airflow around the device, which frequently causes perspiration by the user to accumulate to uncomfortable and even unhygienic levels. In some cases, perspiration has even accumulated to levels so extreme that damage to HMD devices has been reported.

Although HMD support assembly designs have not advanced to address this problem, add-on products have been developed to absorb perspiration for improving comfort and hygiene for HMD device users. For example, removeable and washable covers made of highly absorbent materials (e.g., cotton) have been designed for covering support assemblies to serve as an interface between users' heads and the heat generating portion of HMD devices. Such products focus on continually absorbing and holding onto perspiration during operation. Unfortunately, such products are generally made of thick and resilient materials that, while effective at absorbing perspiration, restrict airflow and hold heat against the user's skin—thereby increasing perspiration rates.

It is with respect to these and other considerations that the disclosure made herein is presented.

SUMMARY

Technologies described herein provide a perspiration dissipating support assembly for head-mounted-display (HMD) devices. Generally described, the technologies disclosed herein enable supporting forces for the heat generating portion of an HMD device to be spread over a large portion of a user's head while simultaneously facilitating dissipation of both liquid perspiration and vapor perspiration via respective dedicated dissipation mechanisms. Unlike conventional perspiration management add-on products for HMD devices, the technologies described herein are not limited to absorbing and holding onto the user's perspiration during operation. Furthermore, as compared to conventional support assemblies for the heat generating portions of HMD devices (e.g., large non-breathable pads that cover substantial surfaces of a user's head and/or face), the disclosed technologies increase airflow to the user's skin thereby removing heat from the user's skin and decreasing perspiration rates.

Being designed for use with HMD devices, the support assembly described herein may be attached to an "electronics" housing that encloses various electronic components such as, for example, processors and/or batteries that emit heat during operation. The electronic components are typically configured to cause a display, that is coupled to the housing, to generate imagery within a field-of-view of the user. For example, in an Augmented-Reality (AR) embodiment, the display may be a transparent waveguide display through which a real-world environment is visible to the user and from which the imagery is generated to augment the real-world environment. Alternatively, in a Virtual-Reality (VR) embodiment, the display may be an opaque Organic Light-Emitting Diode (OLED) Display that replaces the real-world environment with a virtual one. It can be appreciated that in order to present a suitable visual experience to the user, it may be important to maintain a position of the display with respect to the field-of-view of the user.

Maintaining the position of the display to an adequate degree requires sufficient supporting forces to be obtained from the user's head. In order to obtain supporting forces that are sufficient to maintain the position of the display without causing pressure related discomfort to the user, the support assembly described herein may suitably distribute the supporting forces over a relatively large portion of the user's head (e.g., 8 $in^2$, 10 $in^2$, 12 $in^2$, or any other suitable area). Although distributing forces over a large area may prevent discomfort by eliminating high exerted pressures (e.g., force per area), in conventional HMD device support assemblies that incorporate pads covered with leather and other non-breathable materials covering a large area exacerbates issues associated with perspiration. However, unlike conventional support assemblies, configurations of the support assembly described herein are specifically adapted to wick liquid-perspiration away from the user's head and/or to allow sufficient breathability so that vapor perspiration easily escapes into the ambient environment rather than condensing onto the support assembly.

In some configurations, a support assembly is tailored to "active users" and is configured to continuously wick liquid-perspiration away from the user's head for evaporation into the ambient environment. Such configurations may be particularly desirable for use cases in which a user is performing physical activities that result in the user actively perspiring in liquid-form. For example, a worker that is performing various field tasks such as inspecting and/or repairing construction equipment may perspire from the rigor of the activity alone—even without wearing an HMD device.

In some such "active" configurations, the support assembly may include a wicking layer having an inner surface that contacts the skin on the user's head and an outer surface that is opposite the inner surface and, therefore, faces away from the user's head. The wicking layer may be a textile that draws liquid perspiration away from the body and, in various embodiments, may have directional wicking and/or antimicrobial properties. The support assembly may be designed to couple the above described "electronics" housing to the head of the user with a flexible band that encircles (e.g., tightly wraps around) the head of the user.

The wicking layer may include and/or be attached to one or more wicking protrusions that extend away from the head of the user. For example, as described in more detail below, the support assembly may include a vapor-permeable spacer. In various embodiments, the wicking protrusion described herein may extend over a top end of the vapor-permeable spacer. In this way, the wicking protrusion draws liquid-perspiration away from the user (which has the effect of improving the user's comfort) to a region with increased airflow and/or surface area (which has the effect of increasing the rate of evaporation).

Additionally, or alternatively, the wicking protrusion may extend through a portion of the vapor-permeable spacer to come into thermal contact with a thermal conduit that transfers heat emitted within the device housing (e.g., by the electrical components) out of the housing. In this way, heat that is produced by the operation of an HMD device may be harnessed and used to accelerate the rate at which a user's liquid-perspiration is evaporated into the ambient environment. Similarly, since conversion of the liquid-perspiration into vapor-perspiration requires the absorption of latent heat, embodiments described herein which draw liquid-perspiration into contact with a thermal conduit actually increase the rate at which the thermal conduit is able to remove heat from the housing.

The support assembly may also include a vapor-permeable spacer positioned between the outer surface of the wicking layer and the device housing. The vapor-permeable spacer may be constructed from a semi-rigid material that is suitable for being at least partially compressed against the head of the user to generate reactive supporting forces that are adequate to maintain a position of the display within a field-of-view of the user. When compressed against the user's head, the vapor-permeable spacer may distribute the supporting forces across the contact area where the wicking layer contacts the skin of the user's head.

In some embodiments, the vapor-permeable spacer may be a three-dimensional (3D) spacer fabric. As used herein, the term "3D spacer fabric" may refer to any textile that is constructed of woven strands that extend between two (or more) opposing sides in a manner so as to provide semi-rigid support between these opposing sides. For example, in contrast to a two-dimensional (2D) knitted fabric, a 3D spacer fabric may be constructed from two separate 2D knitted fabrics that are joined together by weaving a microfilament yarn therebetween. It should be appreciated that, according to standard testing methods (e.g., ASTM D737), typical 3D spacer fabrics are substantially more vapor-permeable (e.g., on the order of 10 times more vapor-permeable) than regular 2D knitted fabrics.

Additionally, or alternatively, the vapor-permeable spacer may be an open-cell foam. As used herein, the term "open-cell foam" may refer to any material having a discernable cell-like structure wherein individual cells are open with respect to other cells so as to enable fluids to freely pass therebetween. The arrangement of the individual cells may exhibit a random structure or an ordered structure.

Due to the vapor-permeable spacer being positioned against the outer surface of the wicking layer and also facilitating large vapor transmission rates throughout, it can be appreciated that the support assembly disclosed herein is designed to efficiently wick perspiration away from the user's head to the outer surface of the wicking layer where it is quickly evaporated into a passing stream of air. This represents a substantial advantage over the aforementioned conventional HMD device supports having support pads that incorporate non-breathable materials (e.g., leather, etc.) that trap the liquid-perspiration against the skin of the user's head for as long as the user is wearing the HMD device.

In some configurations, the support assembly disclosed herein is tailored to "static users" and is configured to maximize the air circulation at the user's head thereby preventing vapor-perspiration from condensing on the interface between the user's head and the support assembly. Such configurations may be particularly desirable for use cases in which a user is performing sedentary activities that do not result in the user actively perspiring at rates that are high enough to cause perspiration to condense on the body in liquid-form. For example, an office employee that is performing various sedentary tasks such as computing work may perspire at such a low rate that perspiration evaporates as quickly as it is expelled.

In some such "static" configurations, the support assembly may be configured with a vapor-permeable contact layer that is positioned between the user's head and the vapor-permeable spacer. In some instances, where the vapor-permeable spacer is constructed of a 3D spacer fabric, the vapor-permeable contact layer may be a 2D knitted fabric that is an integral part of the 3D spacer fabric. Stated alternatively, the vapor-permeable contact layer may be the outer 2D knitted fabric of the 3D spacer fabric whereas the vapor-permeable spacer may be the inner woven portion of the 3D spacer fabric.

These and various other features will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with another number included within a parenthetical (and/or a letter without a parenthetical) to refer to each individual item. Generic references to the items may use the specific reference number without the sequence of letters.

In FIG. 3A, the vapor-permeable spacer is shown in an uncompressed state, e.g., a relaxed state not mounted to a head.

DETAILED DESCRIPTION

The following Detailed Description describes technologies for providing a perspiration dissipating support assembly for head-mounted-display (HMD) devices. Generally described, the technologies disclosed herein enable supporting forces for an HMD device to be spread over a large portion of a user's head while facilitating dissipation of both liquid perspiration and vapor perspiration via respective dedicated dissipation mechanisms. Unlike conventional perspiration management "add-on" products for HMD devices that merely absorb and eventually become saturated with a continuous build-up of perspiration, the technologies described herein facilitate and even accelerate dissipation of the user's perspiration during operation. Furthermore, as compared to conventional support assemblies for HMD devices (e.g., large non-breathable pads that cover substantial surfaces of a user's head), the disclosed technologies provide increased airflow at the interface between the user's skin and the support assembly—the result being removal of heat from the user's skin and decreasing perspiration rates.

The present invention is believed to be applicable to a variety of systems and approaches involving management of perspiration for wearable electronics. Aspects of the invention disclosed below are described in the context of an Augmented-Reality (AR) HMD device. While the present invention is not necessarily limited to such devices, an appreciation of various aspects of the invention is best gained through a discussion of examples in this context. Accordingly, aspects of the disclosure below that are not expressly recited in the claims are not to be interpreted as limiting of the claims in any way whatsoever.

Figure 1:
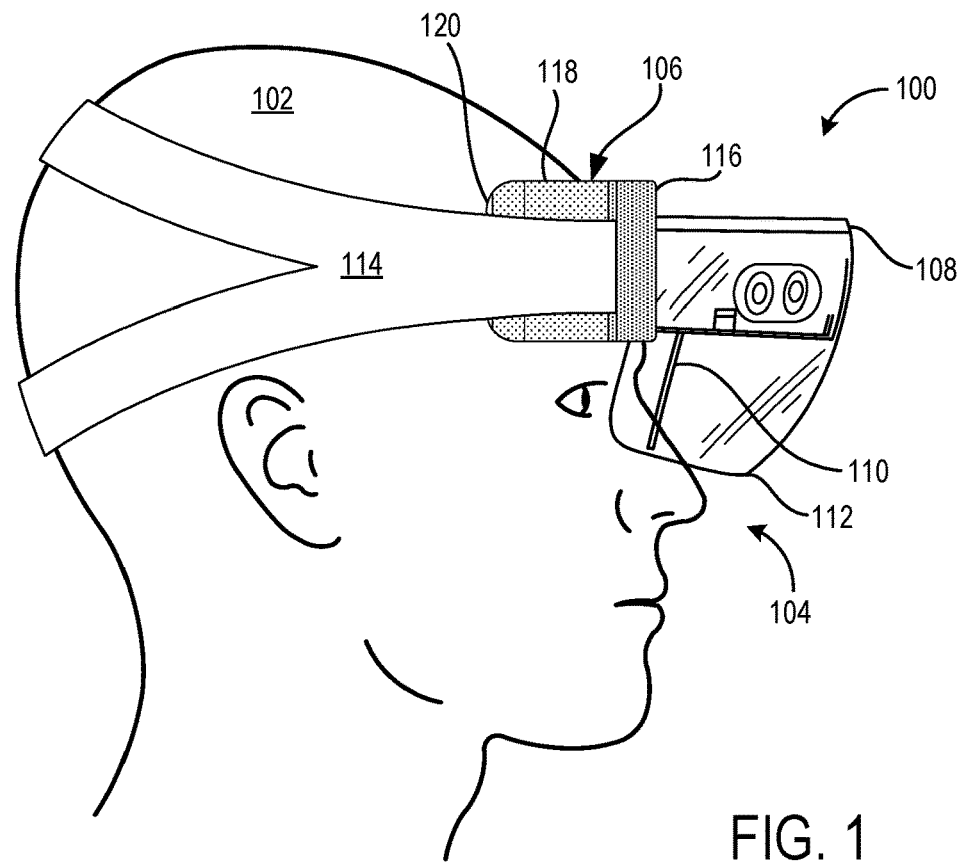
FIG. 1 is a side view of an exemplary Head-Mounted-Display (HMD) device that is being supported on a head of a user by a perspiration dissipating support assembly.

FIG. 1 is a side view of an exemplary HMD device 100 that is being supported on a head 102 of a user 104 by a perspiration dissipating support assembly 106 (also referred to as a "support assembly"). The HMD device 100 may include a housing 108 that at least partially encloses various heat emitting electronic components (e.g., a central processing unit, a graphics processing unit, and/or a battery) that emit heat during operation. The housing 108 may support a display 110 that is configured to generate images within a field-of-view of the user 104 (e.g., in from the user's eyes). For example, the HMD device 100 can be used for augmented reality (AR) and/or virtual reality (VR) applications. In implementations where the HMD device 100 is an AR-based HMD device, the display 110 may be a transparent display element that enables the user 104 to concurrently see both a real-world environment (e.g., that is surrounding her) and AR content being generated by the display 110. The HMD device 100 may further include a visor 112 that is configured to protect one or both of the user's eyes and/or the display 110 when the HMD device 100 is being worn by the user 104 during operation.

It can be appreciated that in order to present a suitable visual experience to the user 104 it may be important to maintain a position of the display 110 with respect to the field-of-view of the user 104. For example, if the display 110 is unstable and wobbles and/or shifts within the user's field-of-view, then the user's perception of the generated images will be impaired. Maintaining the position of the display 110 to an adequate degree requires sufficient supporting forces to be obtained from the user's head 102.

In order to accomplish this, various embodiments of the support assembly 106 include a band 114 that is configured to encircle (e.g., tightly wrap around) the head 102 of the user 104. In various embodiments, the band 114 may be at least partially flexible so as to comfortably conform to the contours of the user's head 102. For example, the band 114 may be a flexible elastic band that, in various embodiments, is also adjustable.

The band 114 may be directly and/or indirectly attached to the housing 108 in order to support the housing 108 and/or the display 110 (and/or any other components of the HMD device 100 for that matter) in an appropriate position with respect to the head 102. As illustrated, the band 114 is attached to a carrier element 116 on which the housing 108 is mounted. Thus, in the illustrated embodiment, the band 114 is indirectly attached to the housing 108. The carrier element 116 may be any suitable component for supporting components of the HMD device 100 and for distributing forces emitted by the band 114 into a vapor-permeable spacer 118 that facilitates circulation between the housing 108 and/or the carrier element 116 and the user's head 102 as described herein.

Figure 2:
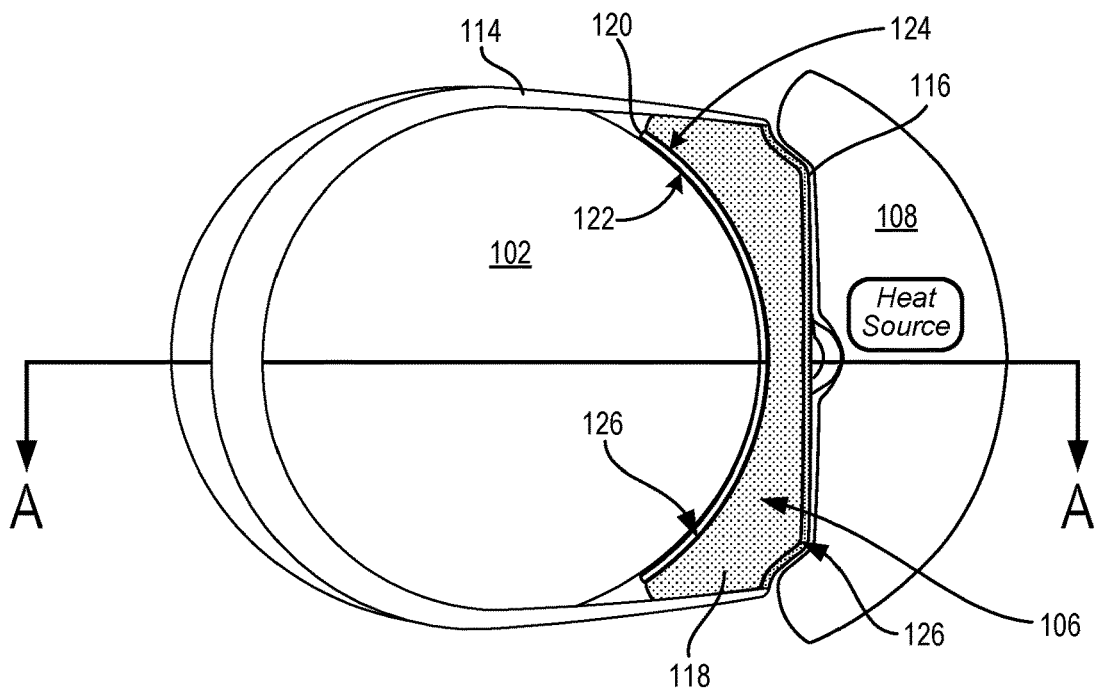
FIG. 2 is a top view of the exemplary HMD device that is being supported on the head by the perspiration dissipating support assembly as shown in FIG. 1.

Referring now to FIG. 2, illustrated is a top view of the exemplary HMD device 100 that is being supported on the head 102 by the support assembly 106 as shown in FIG. 1. As prominently shown in FIG. 2, the support assembly 106 includes a vapor-permeable contact layer 120 (also slightly visible in FIG. 1) having an inner surface 122 positioned to contact the head 102 and an outer surface 124 positioned away from the head 102. In this embodiment, the vapor-permeable spacer 118 is positioned between the outer surface 124 of the vapor-permeable contact layer 120 and the carrier element 116. As illustrated, the vapor-permeable spacer 118 is also positioned between the outer surface 124 and the housing 108.

In some embodiments, the vapor-permeable spacer 118 is constructed from a semi-rigid material that is suitable for being at least partially compressed against the head 102 to generate reactive supporting forces adequate to maintain a position of the display 110 within a field-of-view of the user 104. For example, the band 114 may wrap around the head 102 and compress the vapor-permeable spacer 118 against a "contact area" of the user's forehead, i.e., the surface area at which the vapor-permeable contact layer 120 touches the head 102. When compressed against the user's head 102, the vapor-permeable spacer 118 distributes the supporting forces across the contact area. In this way, the vapor-permeable contact layer 120 and the vapor-permeable spacer 118 may jointly conform to the shape of the user's head 102 to distribute supporting forces evenly across the "contact area" so as to prevent user discomfort. Exemplary semi-rigid materials may include, but are not limited to, various materials having some degree of rigidity such as an open-cell foam and/or a three-dimensional structured fabric.

In some embodiments, the vapor-permeable spacer 118 may exhibit a stress-strain response for compression that includes a "collapse plateau" in which stress (e.g., Newton/meter$^2$) only slightly varies with strain. Stated alternatively, the stress may remain relatively constant over some range of compression distances. For example, the vapor-permeable spacer 118 may exhibit a stress-strain response similar to that of a non-linear spring designed for a nonlinear relationship between force and displacement. In this way, the vapor-permeable spacer 118 may exert substantially even contact pressures against different portions of the head 102 even if the shape of the head 102 results in different amounts of displacement across the vapor-permeable spacer 118.

In various embodiments, the vapor-permeable contact layer 120 may be a relatively thin fabric material (e.g., less than 5 mm, less than 3 mm, etc.) having suitable properties for prolonged contact with a user's 104 skin. For example, the vapor-permeable contact layer 120 may be a thin layer of a soft napped or woven polyester fabric. The vapor-permeable spacer 118 may be a semi-rigid spacing material that provides vapor-permeability on the order of several times that of the vapor-permeable contact layer 120.

In some embodiments, the vapor-permeable contact layer 120 may have a first Moisture Vapor Transmission Rate (MVTR) and the vapor-permeable spacer 118 may have a second MVTR of at least 2 times that of the first MVTR. In some embodiments, the second MVTR of the vapor-permeable spacer 118 may be at least 3 times that of the first MVTR of the vapor-permeable contact layer 120. In some embodiments, the second MVTR of the vapor-permeable spacer 118 may be at least 4 times that of the first MVTR of the vapor-permeable contact layer 120. In some embodiments, the second MVTR of the vapor-permeable spacer 118 may be at least 5 times that of the first MVTR of the vapor-permeable contact layer 120. In some embodiments, the second MVTR of the vapor-permeable spacer 118 may be at least 6 times that of the first MVTR of the vapor-permeable contact layer 120. In some embodiments, the second MVTR of the vapor-permeable spacer 118 may be at least 7 times that of the first MVTR of the vapor-permeable contact layer 120. In some embodiments, the second MVTR of the vapor-permeable spacer 118 may be at least 8 times that of the first MVTR of the vapor-permeable contact layer 120. In some embodiments, the second MVTR of the vapor-permeable spacer 118 may be at least 9 times that of the first MVTR of the vapor-permeable contact layer 120. In some embodiments, the second MVTR of the vapor-permeable spacer 118 may be at least 10 times that of the first MVTR of the vapor-permeable contact layer 120.

In some embodiments, the vapor-permeable spacer 118 may be a three-dimensional (3D) spacer fabric. As used herein, the term "3D spacer fabric" may refer to any textile that is constructed of woven strands that extend between two (or more) opposing sides and provide semi-rigid support between the at least two opposing sides to maintain a highly vapor-permeable inner region. For example, in contrast to a two-dimensional (2D) knitted fabric, a 3D spacer fabric may be constructed of two separate 2D knitted fabrics that are joined together by weaving a microfilament yarn therebetween. It will be appreciated that 3D spacer fabrics may be substantially more vapor-permeable (e.g., on the order of 10 times) than regular 2D knitted fabrics according to standard testing methods (e.g., ASTM D737).

Additionally, or alternatively, the vapor-permeable spacer 118 may be an open-cell foam. As used herein, the term "open-cell foam" may refer to any material having a discernable cell-like structure wherein individual cells are open with respect to other cells so as to enable fluids to freely pass therebetween. The arrangement of the individual cells may exhibit a random structure or an ordered structure.

By positioning the vapor-permeable spacer 118 against the outer surface 124 of the vapor-permeable contact layer 118, it can be appreciated that forces for supporting the HMD device 100 can be spread across a relatively large contact area (e.g., 6 in$^2$, 9 in$^2$, or any other suitable area) on the user's head 102 without untenably impairing circulation to this contact area. At the same time, by allowing for large vapor transmission rates throughout the contact area, it can be appreciated that the support assembly disclosed herein is designed so that vapor-perspiration may quickly pass from the user's head 102 through the vapor-permeable contact layer 120 to the outer surface 124 where it is quickly evaporated into a passing stream of air. This represents a substantial advantage over the aforementioned convention HMD device supports which would trap perspiration (in both liquid and vapor form) against the user's head 102 for as long as the user is wearing the HMD device 100.

In some embodiments, the vapor-permeable spacer 118 and the vapor-permeable contact layer 120 may be adhered (e.g., mechanically coupled) together. For example, an adhesion layer 126 may be disposed at a boundary between the vapor-permeable spacer 118 and the vapor-permeable contact layer 120. The adhesion layer 126 may be a vapor-permeable adhesive that exhibits a Moisture Vapor Transmission Rate (MVTR) equal to and/or greater than the vapor-permeable contact layer 120. In this way, the adhesion layer 126 will not inhibit vapor transmission to the inside of the vapor-permeable spacer 118. In some embodiments, the vapor-permeable spacer 118 may also be coupled to the carrier element 116. In the illustrated example, the adhesion layer 126 is also disposed at a boundary between the vapor-permeable spacer 118 and the carrier element 116. Exemplary adhesion layers 126 may include, but are not limited to, solvent-based adhesives, hot-melt adhesives, thermoplastic adhesives, epoxies, cyanoacrylates, and/or polyurethanes. Additionally, or alternatively, the vapor-permeable spacer 118 may be sutured and/or sewn and/or stapled to the vapor-permeable contact layer 120 and/or the carrier element 116.

In some implementations, the carrier element 116 may be an injection molded plastic that is substantially non-porous and substantially non-permeable to vapor-perspiration. In such implementations, the adhesion layer 126 that is selected for the boundary between the carrier element 116 and the vapor-permeable spacer 118 may be substantially impervious to vapor-perspiration transmission. In some embodiments, the carrier element 116 may be an injection molded plastic that is porous and, therefore, permeable to vapor-perspiration. In such implementations, the adhesion layer 126 selected for the boundary between the carrier element 116 and the vapor-permeable spacer 118 may be similarly vapor-permeable.

In some configurations, the support assembly 106 may be specifically tailored to "static users" and, therefore, configured to maximize circulation at the user's head 102 to prevent vapor-perspiration from condensing at the interface between the user's head 102 and the support assembly 106. Such configurations may be particularly desirable for use cases where a user is performing sedentary tasks that do not result in the user 104 actively perspiring at rates high enough to cause perspiration to condense into liquid-form on the user's body. For example, an office employee that is performing various sedentary tasks such as computing work may perspire at a low enough rate such that perspiration evaporates as quickly as it is expelled.

In such "static" configurations, the vapor-permeable contact layer 120 that contacts the user's head 102 may be a fabric having high vapor transmission properties to allow vapor-perspiration to pass from the user's head 102 into the vapor-permeable spacer 118. The thickness of the vapor-permeable contact layer 120 may be minimized in relation to the vapor-permeable spacer 118 so as to effectively eliminate the resistance to vapor-transmission into the vapor-permeable spacer 118. As a specific but non-limiting example, the vapor-permeable contact layer 120 may be in the range of 1 mm to 3 mm thick whereas the vapor-permeable spacer 118 may be in the range of 15 mm to 30 mm thick in an uncompressed state (and in the range of 10 mm to 20 mm thick in a compressed state when worn by the user 104). Additionally, due to the "thinness" of the vapor-permeable contact layer 120, the effects of in-plane vapor transmission can be minimized to negligible levels such that substantially all vapor-perspiration travels directly through the vapor-permeable contact layer 120 into the vapor-permeable spacer 118.

In some configurations, the support assembly 106 may be specifically tailored to "active users" and, therefore, configured to continuously wick liquid-perspiration away from the user's head 102 for evaporation into the ambient environment. Such configurations may be particularly desirable for use cases where a user is performing physical activities that induce heavy perspiration at rates that result in perspiration condensing into liquid-form on the user's skin. A worker that is performing various field tasks may perspire from the rigor of the activity alone.

In such "active" configurations, the vapor-permeable contact layer 120 may be a wicking layer that has wicking properties for drawing perspiration away from the user's head 102. For example, in some embodiments, the vapor-permeable contact layer 120 may have wicking properties that tend to draw perspiration (e.g., via capillary action resulting from a particular technical-weave pattern) that is absorbed at the inner surface 122 toward the outer surface 124 at which circulation within the vapor-permeable spacer 118 (which may have a MVTR of 5, 7, or even 10 or more times that of the vapor-permeable contact layer 120) causes the perspiration to quickly evaporate.

Figure 3A:
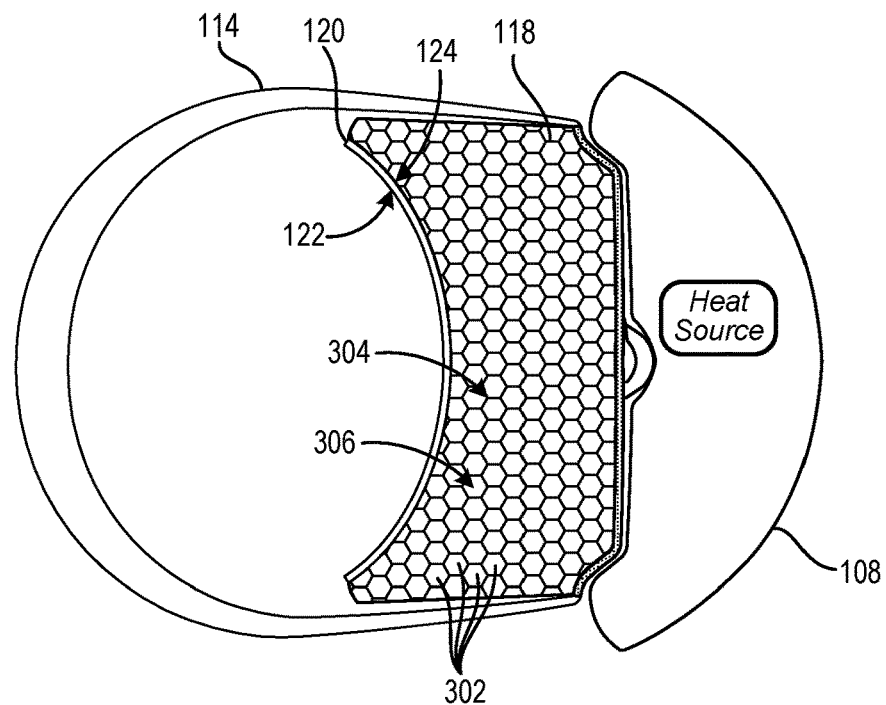
FIG. 3A illustrates an exemplary embodiment of the support assembly in which a vapor-permeable spacer is made of an open-cell foam.
Figure 3B:
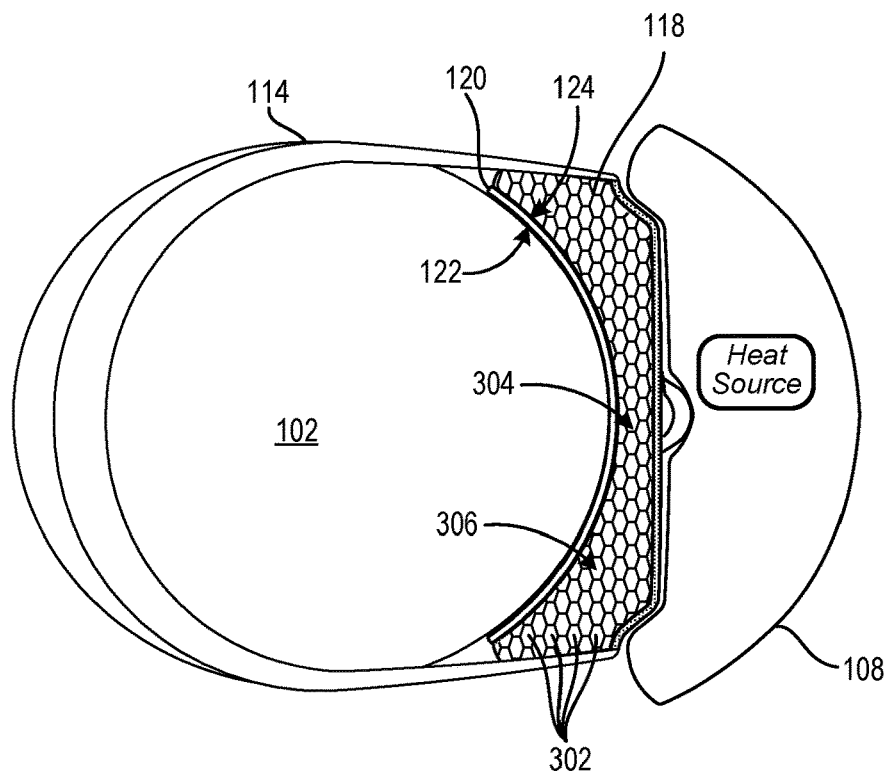
FIG. 3B illustrates the exemplary support assembly of FIG. 3A wherein the vapor-permeable spacer is in a compressed state due to being mounted onto a head of a user.

Turning now to FIGS. 3A and 3B (collectively referred to as FIG. 3), illustrated is an exemplary embodiment of a support assembly 106 in which the vapor-permeable spacer 118 is configured to compress for conforming to the contours of the user's head 102. With specific reference to FIG. 3A, the support assembly 106 is shown with the vapor-permeable spacer 118 in an uncompressed state (e.g., a relaxed state not mounted to a head 102). Then, with specific reference to FIG. 3B, the support assembly 106 is shown with the vapor-permeable spacer 118 in a compressed state due to being mounted onto the head 102 of the user 104. It should be appreciated that the illustrations of FIG. 3 are not intended to convey scale, and the degree to which the vapor-permeable spacer 118 compresses may be exaggerated to convey the inventive concepts herein.

As described above, the vapor-permeable spacer 118 may be an open-cell foam. As used herein, the term "open-cell foam" may refer to any material having a discernable cell-like structure wherein individual cells 302 are open with respect to other cells so as to enable fluids to freely pass therebetween. In various embodiments, the arrangement of the individual cells 302 may exhibit a random structure. Alternatively, and as illustrated in FIG. 3, the arrangement of the individual cells 302 may exhibit an ordered structure 304 (e.g., the open-cell foam may be a "regular" foam). It will be appreciated that various techniques may be deployed to manufacture "regular" foams such as, for example, direct molding and/or selective laser melting.

In some embodiments, the ordered structure 304 may define channels through which fluids are capable of freely passing. For example, in the illustrated embodiment, the individual cells 302 are shown to exhibit an ordered structure 304 comprised of stacked layers of Kelvin cells 302 (e.g., Tetrakaidekahedrons). Thus, the illustrated ordered structure 304 represents a Weaire-Phelan structure of an idealized regular foam of equal-sized cells each having 14 faces. It can be appreciated therefore that as illustrated looking into the page, a plurality of channels 306 are shown through which a fluid may freely pass from one cell to another cell and so on. While it can be seen that the individually labeled channel 306 propagates from a top-end of the vapor-permeable spacer 118 to a bottom-end of the vapor-permeable spacer 118, it can be appreciated that various ordered structures may result in a first set of channels 306 which propagate from one cell 302 to another in a first direction, and at the same time a second set of channels 306 which propagate from one cell 302 to another in a second direction (e.g., in an orthogonal direction), and even yet another third set of channels 306 which propagate from one cell 302 to another in a third direction.

Referring now to FIG. 3B, it can be appreciated that the ordered structure 304 may be deformed when the user 104 wears the support assembly 106. In this way, the vapor-permeable spacer 118 distributes the supporting forces across the contact area when compressed against the user's head 102. Thus, the vapor-permeable contact layer 120 (which may be a wicking layer as described herein) and the vapor-permeable spacer 118 may jointly conform to the shape of the user's head 102 to distribute supporting forces evenly across the "contact area" so as to prevent user discomfort.

Figure 4:
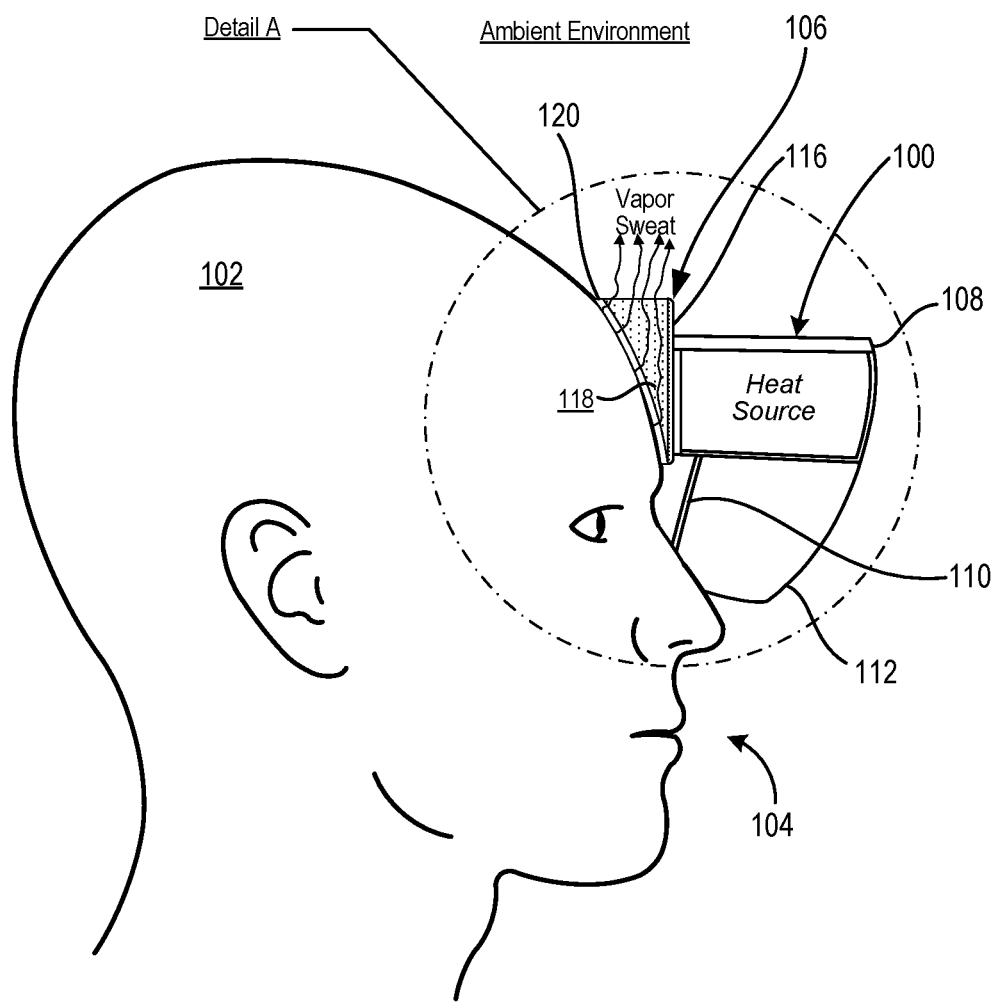
FIG. 4 is a cross-section view, taken along the line A-A (shown in FIG. 2), of the exemplary HMD device that is being supported on the head of the user by the support assembly.

FIG. 4 is a cross-section detail view, taken along the line A-A (shown in FIG. 2), of the exemplary HMD device 100 that is being supported on the head 102 of the user 104 by support assembly 106. As illustrated, vapor perspiration (illustrated as thin solid black wavy lines) is shown to continually permeate directly through the vapor-permeable contact layer 120 and into the vapor-permeable spacer 118. Thus, the implementation shown in FIG. 4 represents an exemplary "static" implementation in which the user 104 is continually perspiring (e.g., as persons typically do) at a rate that is low enough that substantially all of the user's 104 perspiration passes through the vapor-permeable contact layer 120 without condensing into liquid form and, thereby, saturating the vapor-permeable contact layer 120. Then, the abundant circulation within the vapor-permeable spacer 118 causes the user's vapor-perspiration to continue out into the ambient environment.

Figure 5:
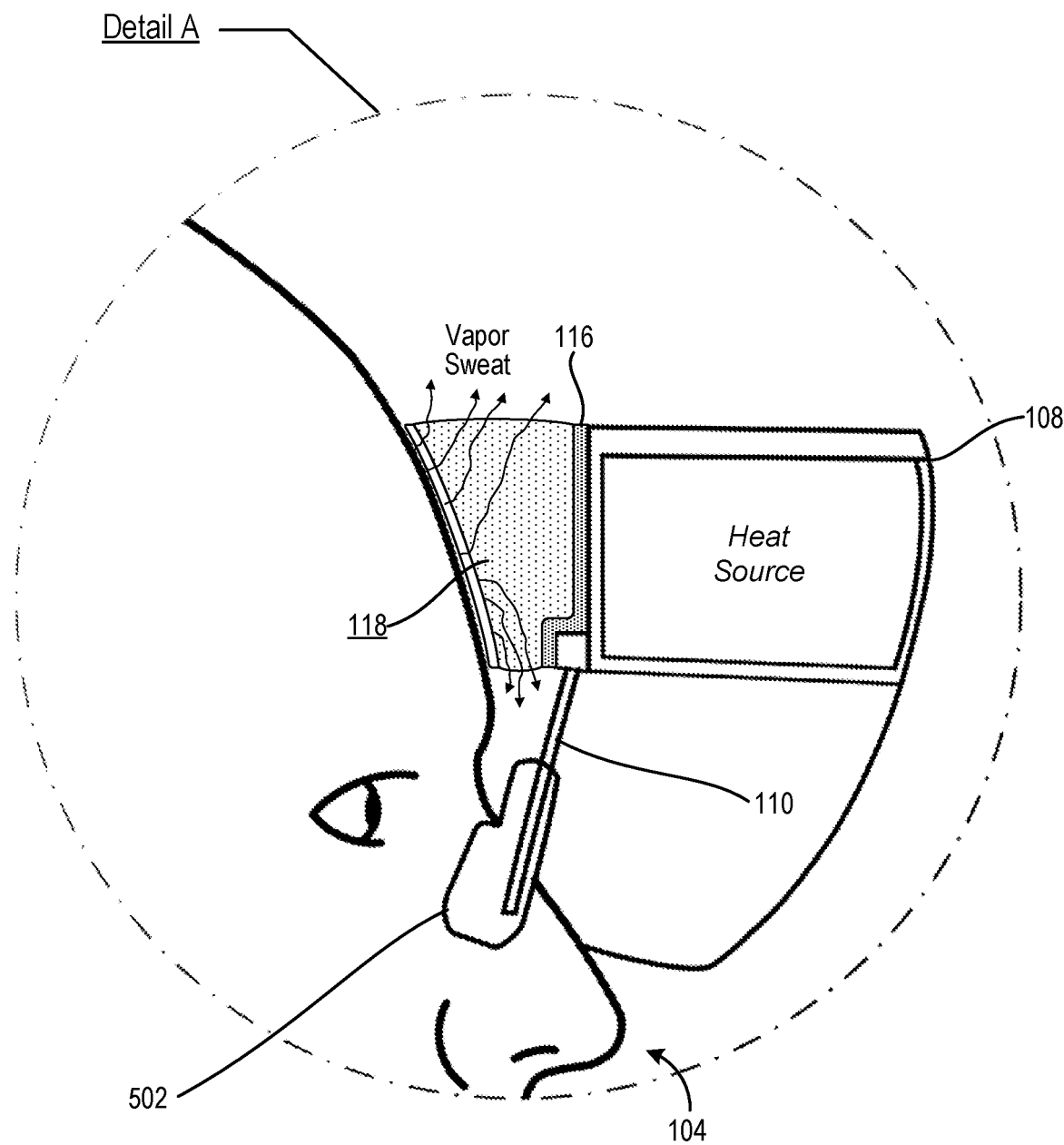
FIG. 5 is a cross-section view of an embodiment of the support assembly in which vapor-perspiration is enabled to permeate out of both a top-end and a bottom-end of the vapor-permeable spacer.
Figure 6:
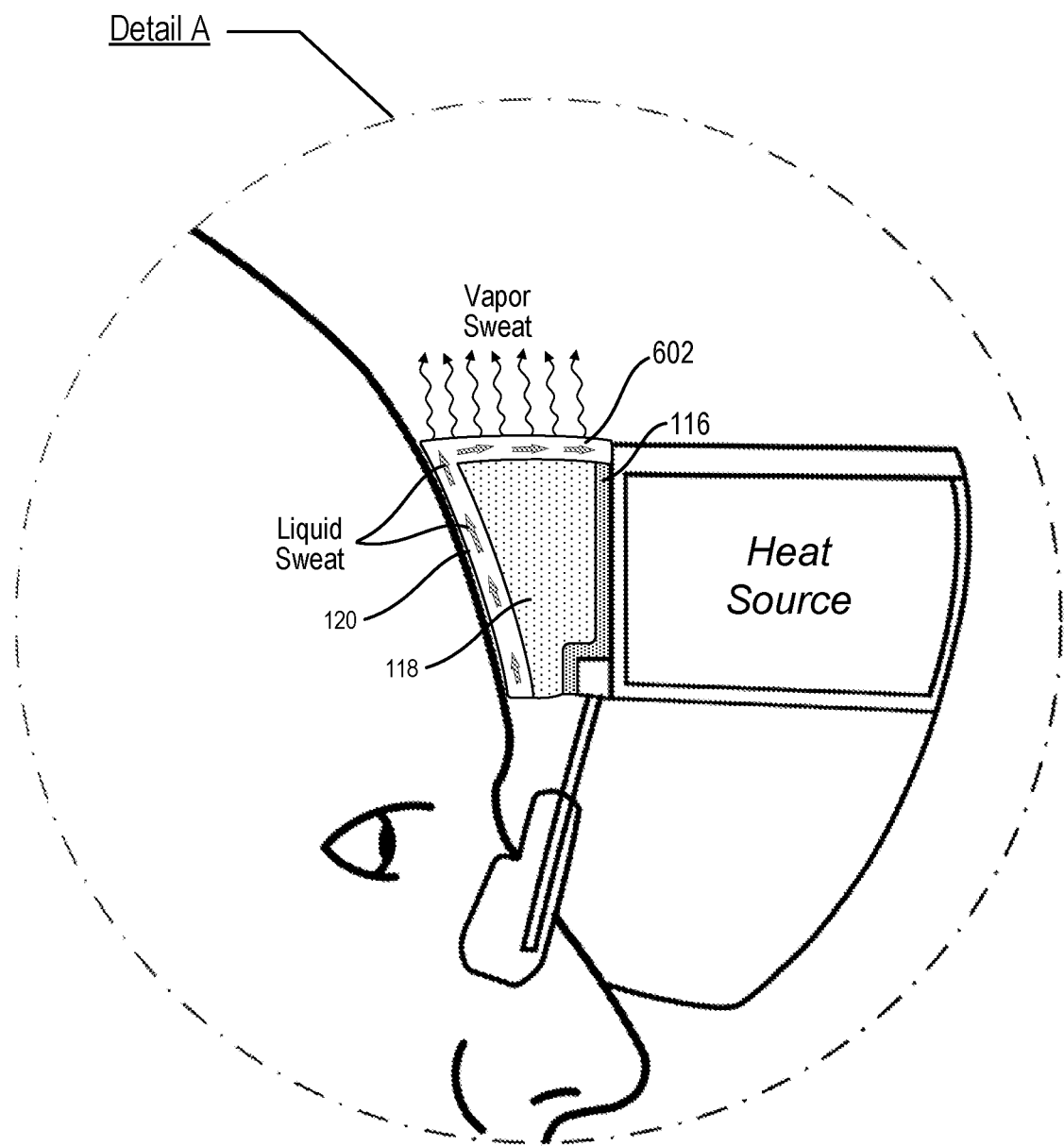
FIG. 6 is a cross-section view of an embodiment of the support assembly in which the vapor-permeable contact layer includes a wicking protrusion that extends over the top-end of the vapor-permeable spacer.
Figure 7:
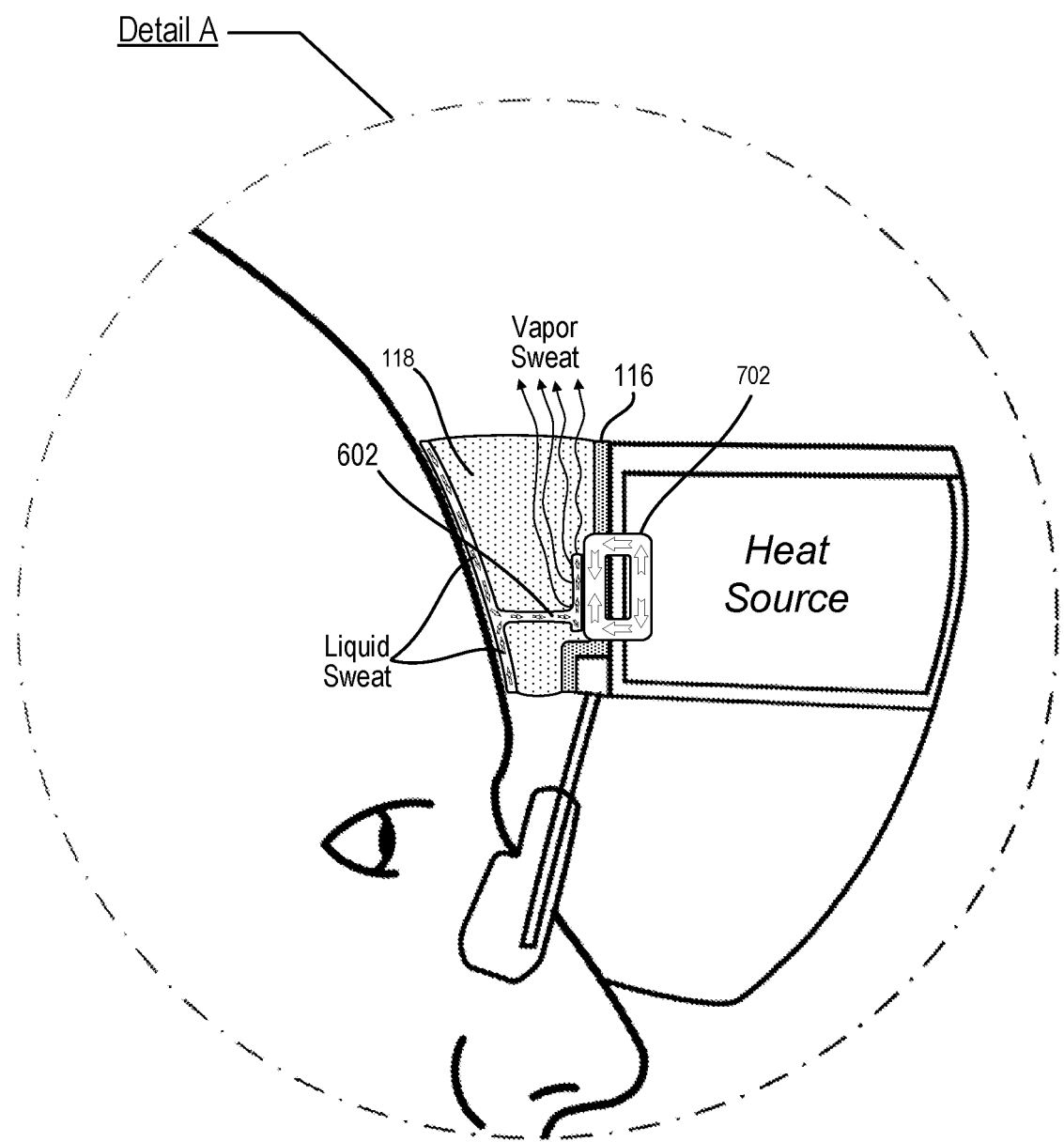
FIG. 7 is a cross-section view of an embodiment of the support assembly in which the vapor-permeable contact layer includes a wicking protrusion that extends through a portion of the vapor-permeable spacer and into thermal contact with a thermal conduit.

FIGS. 5-7 illustrate various alternate embodiments of the support assembly 106 and are enlarged in scale based on the detail section labeled "Detail A" is shown in FIG. 4. Specific details being illustrated with another specific detail or, alternatively, apart from another specific detail is not intended to be construed as a limitation. Thus, any individual detail illustrated in any figure herein may be combined in practically any manner with any other individual detail illustrated in any other figure herein. Other individual details illustrated and/or described throughout this disclosure shall be interpreted accordingly.

FIG. 5 is a cross-section detail view of an embodiment of the support assembly 106 in which the vapor-permeable spacer 118 provides separation between the vapor-permeable contact layer 120 and the carrier element 116 so that vapor-perspiration permeates out of both a top-end and a bottom-end of the vapor-permeable spacer 118. In this way, as air within the vapor-permeable spacer 118 is heated by the user's body heat, it becomes relatively more buoyant than air within the surrounding environment and rises out of the top-end of the vapor-permeable spacer 118. Due to both of the bottom-end and the top-end of the vapor-permeable spacer 118 being open to the ambient environment, the tendency of the heated air within the vapor-permeable spacer 118 to rise (e.g., due to being heated by the user's body) is not impeded. In this way, such an embodiment of the support assembly 106 harnesses the user's own body heat to accelerate the rate at which perspiration is dissipated away from the user 104.

In some embodiments, the support assembly 106 may include a nose-bridge 502 and the vapor-permeable spacer 118 may be configured to maintain the position of the display 110 within the user's field-of-view by maintaining slight pressure of the nose-bridge 502 against the user's nose. In this way, stability of the display 110 within the user's field-of-view may be optimized to further improve the user's perception of the images generated by the display.

FIG. 6 is a cross-section detail view of an embodiment of the support assembly 106 in which the vapor-permeable contact layer 120 includes a wicking protrusion 602 that extends over the top-end of the vapor-permeable spacer 118. As illustrated, such embodiments may be configured to wick liquid perspiration (shown as gray arrows) away from the user 104 to a particular region at which the liquid-perspiration evaporates into the ambient environment. As the liquid perspiration evaporates, the wicking protrusion 602 at least partially dries out, which has the effect of increasing the capillary action for drawing additional liquid perspiration into the wicking protrusion 602. In this way, the wicking protrusion 602 continually draws liquid-perspiration away from the user 104 (which has the effect of improving the user's comfort) and to a region with increased airflow and/or surface area (which has the effect of increasing the rate of evaporation).

FIG. 7 is a cross-section detail view of an embodiment of the support assembly 106 in which the vapor-permeable contact layer 120 includes a wicking protrusion 602 that extends through a portion of the vapor-permeable spacer 118 and into thermal contact with a thermal conduit 702 that transfers the heat (shown as white arrows within the thermal conduit 702) emitted within the housing 108 by the electrical components. Exemplary thermal conduits include various highly thermally conductive metal foils, graphite fibers, flexible vapor chambers, and/or any other material and/or device suitable for efficiently transferring heat from one location to another location at which the heat is dissipated into an ambient environment. In this way, the heat that is produced by the operation of an HMD device 100 may be harnessed and used to accelerate the rate at which a user's liquid-perspiration is evaporated into the ambient environment. Similarly, since conversion of the liquid-perspiration into vapor-perspiration requires the absorption of latent heat, drawing the liquid-perspiration into contact with the thermal conduit actually increases the rate at which the thermal conduit is able to remove heat from the housing. Thus, such configurations simultaneously increase efficiencies with respect to both perspiration dissipation from the user and thermal dissipation from the HMD device 100.

Example Clauses

The disclosure presented herein may be considered in view of the following clauses.

Example Clause A, a Head-Mounted Display (HMD) device, comprising: a housing from which a display protrudes to generate imagery within a field-of-view of a user; a support assembly to mechanically couple the housing to a head of the user, wherein the support assembly includes at least a vapor-permeable contact layer having an inner surface positioned to contact the head of the user and an outer surface positioned away from the head of the user; and a vapor-permeable spacer disposed at least partially between the outer surface of the vapor-permeable contact layer and the housing, wherein the vapor-permeable spacer is configured to become at least partially compressed when in contact with the head of the user, by the support assembly, between the housing and the head of the user to maintain a position of the display with respect to the field-of-view of the user.

Example Clause B, the HMD device of Example Clause A, further comprising an adhesion layer disposed between the vapor-permeable spacer and the outer surface of the vapor-permeable contact layer, wherein the adhesion layer adheres the vapor-permeable spacer to the outer surface of the vapor-permeable contact layer, and wherein the adhesion layer is substantially liquid-water proof and substantially vapor-water permeable.

Example Clause C, the HMD device of any one of Example Clauses A through B, wherein the vapor-permeable spacer that is configured to maintain the position of the display with respect to the field-of-view is a three-dimensional spacer fabric.

Example Clause D, the HMD device of any one of Example Clauses A through C, wherein the vapor-permeable spacer that is configured to maintain the position of the display with respect to the field-of-view is an open-cell foam having a substantially ordered structure that defines a plurality of channels.

Example Clause E, the HMD device of Example Clause D, wherein the open-cell foam is oriented with respect to the support assembly so that at least some individual channels, of the plurality of channels, extend from at least one of: a top end of the vapor-permeable spacer to a bottom end of the vapor-permeable spacer; or a right end of the vapor-permeable spacer to a left end of the vapor-permeable spacer.

Example Clause F, the HMD device of any one of Example Clauses A through E, wherein the support assembly further includes: a substantially rigid carrier having an inner surface that is coupled to the vapor-permeable spacer and an outer surface that is mechanically coupled to the housing, and a band having a first end that is coupled to a right side of the substantially rigid carrier and a second end that is coupled to a left side of the substantially rigid carrier.

Example Clause G, the HMD device of any one of Example Clauses A through F, wherein the vapor-permeable contact layer is an antimicrobial fabric.

Example Clause H, the HMD device of any one of Example Clauses A through G, further comprising a thermal conduit that is positioned to absorb heat that is emitted by one or more electronic components that are enclosed within the housing and to transfer the heat into at least a portion of the vapor-permeable spacer.

Example Clause I, an apparatus, comprising: a housing that encloses one or more electronic components that generate heat during operation; a display that protrudes downward from the housing to generate imagery within a field-of-view of a user; a support assembly to mechanically couple the housing to a head of the user, wherein the support assembly includes: at least one band for encircling the head of the user; a vapor-permeable wicking layer having an inner surface positioned to contact the head of the user and an outer surface positioned away from the head of the user; and a vapor-permeable spacer disposed at least partially between the outer surface of the vapor-permeable wicking layer and the housing, the vapor-permeable spacer to maintain a position of the display with respect to the field-of-view of the user, wherein the at least one band is configured to generate forces to compress the vapor-permeable spacer against the head of the user.

Example Clause J, the apparatus of Example Clause I, wherein the vapor-permeable wicking layer is a textile having directional wicking properties for facilitating greater liquid transport in a first direction than a second direction, and wherein the vapor-permeable wicking layer is oriented with respect to the support assembly so that the first direction extends away from the head of the user.

Example Clause K, the apparatus of any one of Example Clauses I through J, wherein the vapor-permeable spacer that is configured to maintain the position of the display with respect to the field-of-view is comprised of at least one of a three-dimensional spacer fabric or an open-cell foam.

Example Clause L, the apparatus of any one of Example Clauses I through K, wherein the vapor-permeable spacer that is configured to maintain the position of the display with respect to the field-of-view is an open-cell foam having a substantially ordered structure that defines a plurality of channels extending from a first end of the vapor-permeable spacer to a second end of the vapor-permeable spacer.

Example Clause M, the apparatus of any one of Example Clauses I through L, further comprising an adhesion layer disposed between the vapor-permeable spacer and the outer surface of the vapor-permeable wicking layer, wherein the adhesion layer adheres the vapor-permeable spacer to the outer surface of the vapor-permeable wicking layer.

Example Clause N, the apparatus of any one of Example Clauses I through M, wherein the vapor-permeable wicking layer includes a wicking protrusion that extends away from the head of the user.

Example Clause O, the apparatus of Example Clause N, wherein the wicking protrusion extends through at least a portion of the vapor-permeable spacer toward the housing.

Example Clause P, the apparatus of Example Clause N, further comprising a thermal conduit that protrudes from an interior region of the housing into thermal contact with the wicking protrusion to transfer at least a portion of the heat into the wicking protrusion for accelerating evaporation from the wicking protrusion.

Example Clause Q, the apparatus of any one of Example Clauses I through P, wherein the support assembly further includes a rigid carrier having an inner surface that is coupled to the vapor-permeable spacer and an outer surface that is mechanically coupled to the housing, and wherein the at least one band includes a first end that is coupled to a right side of the substantially rigid carrier and a second end that is coupled to a left side of the rigid carrier.

Example Clause R, an apparatus for securing a wearable electronic device to a user, the apparatus comprising: a housing that encloses one of more electronic components that emit heat during operation; a support assembly to mechanically couple the housing to a body part of the user, wherein the support assembly includes at least a vapor-permeable contact layer having an inner surface positioned to contact the body part of the user and an outer surface positioned away from the body part of the user, and wherein the vapor-permeable contact layer has a first Moisture Vapor Transmission Rate (MVTR); and a vapor-permeable spacer disposed at least partially between the outer surface of the vapor-permeable contact layer and the housing, wherein the vapor-permeable spacer is configured to be at least partially compressed, by the support assembly, between the housing and the body part of the user to maintain a position of the wearable electronic device with respect to the body part of the user, and wherein the vapor-permeable spacer has a second MVTR that is greater that the first MVTR.

Example Clause S, the apparatus of Example Clause R, wherein the second MVTR is at least three times greater than the first MVTR.

Example Clause T, the apparatus of any one of Example Clauses R through S, wherein the second MVTR is at least eight times greater than the first MVTR.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A Head-Mounted Display (HMD) device, comprising:
   a housing from which a display protrudes to generate imagery within a field-of-view of a user;
   a support assembly to mechanically couple the housing to a head of the user, wherein the support assembly includes at least a vapor-permeable contact layer having an inner surface positioned to contact the head of the user and an outer surface positioned away from the head of the user; and
   a vapor-permeable spacer disposed at least partially between the outer surface of the vapor-permeable contact layer and the housing, wherein the vapor-permeable spacer is configured to become at least partially compressed when in contact with the head of the user, by the support assembly, between the housing and the head of the user to maintain a position of the display with respect to the field-of-view of the user.

2. The HMD device of claim 1, further comprising an adhesion layer disposed between the vapor-permeable spacer and the outer surface of the vapor-permeable contact layer, wherein the adhesion layer adheres the vapor-permeable spacer to the outer surface of the vapor-permeable contact layer, and wherein the adhesion layer is substantially liquid-water proof and substantially vapor-water permeable.

3. The HMD device of claim 1, wherein the vapor-permeable spacer that is configured to maintain the position of the display with respect to the field-of-view is a three-dimensional spacer fabric.

4. The HMD device of claim 1, wherein the vapor-permeable spacer that is configured to maintain the position of the display with respect to the field-of-view is an open-cell foam having a substantially ordered structure that defines a plurality of channels.

5. The HMD device of claim 4, wherein the open-cell foam is oriented with respect to the support assembly so that at least some individual channels, of the plurality of channels, extend from at least one of:
   atop end of the vapor-permeable spacer to a bottom end of the vapor-permeable spacer; or
   a right end of the vapor-permeable spacer to a left end of the vapor-permeable spacer.

6. The HMD device of claim 1, wherein the support assembly further includes:
   a substantially rigid carrier having an inner surface that is coupled to the vapor-permeable spacer and an outer surface that is mechanically coupled to the housing, and
   a band having a first end that is coupled to a right side of the substantially rigid carrier and a second end that is coupled to a left side of the substantially rigid carrier.

7. The HMD device of claim 1, wherein the vapor-permeable contact layer is an antimicrobial fabric.

8. The HMD device of claim 1, further comprising a thermal conduit that is positioned to absorb heat that is emitted by one or more electronic components that are enclosed within the housing and to transfer the heat into at least a portion of the vapor-permeable spacer.

9. An apparatus, comprising:
a housing that encloses one or more electronic components that generate heat during operation;
a display that protrudes downward from the housing to generate imagery within a field-of-view of a user;
a support assembly to mechanically couple the housing to a head of the user, wherein the support assembly includes:
at least one band for encircling the head of the user;
a vapor-permeable wicking layer having an inner surface positioned to contact the head of the user and an outer surface positioned away from the head of the user; and
a vapor-permeable spacer disposed at least partially between the outer surface of the vapor-permeable wicking layer and the housing, the vapor-permeable spacer to maintain a position of the display with respect to the field-of-view of the user, wherein the at least one band is configured to generate forces to compress the vapor-permeable spacer against the head of the user.

10. The apparatus of claim 9, wherein the vapor-permeable wicking layer is a textile having directional wicking properties for facilitating greater liquid transport in a first direction than a second direction, and wherein the vapor-permeable wicking layer is oriented with respect to the support assembly so that the first direction extends away from the head of the user.

11. The apparatus of claim 9, wherein the vapor-permeable spacer that is configured to maintain the position of the display with respect to the field-of-view is comprised of at least one of a three-dimensional spacer fabric or an open-cell foam.

12. The apparatus of claim 9, wherein the vapor-permeable spacer that is configured to maintain the position of the display with respect to the field-of-view is an open-cell foam having a substantially ordered structure that defines a plurality of channels extending from a first end of the vapor-permeable spacer to a second end of the vapor-permeable spacer.

13. The apparatus of claim 9, further comprising an adhesion layer disposed between the vapor-permeable spacer and the outer surface of the vapor-permeable wicking layer, wherein the adhesion layer adheres the vapor-permeable spacer to the outer surface of the vapor-permeable wicking layer.

14. The apparatus of claim 9, wherein the vapor-permeable wicking layer includes a wicking protrusion that extends away from the head of the user.

15. The apparatus of claim 14, wherein the wicking protrusion extends through at least a portion of the vapor-permeable spacer toward the housing.

16. The apparatus of claim 14, further comprising a thermal conduit that protrudes from an interior region of the housing into thermal contact with the wicking protrusion to transfer at least a portion of the heat into the wicking protrusion for accelerating evaporation from the wicking protrusion.

17. The apparatus of claim 9, wherein the support assembly further includes a rigid carrier having an inner surface that is coupled to the vapor-permeable spacer and an outer surface that is mechanically coupled to the housing, and wherein the at least one band includes a first end that is coupled to a right side of the substantially rigid carrier and a second end that is coupled to a left side of the rigid carrier.

18. An apparatus for securing a wearable electronic device to a user, the apparatus comprising:
a housing that encloses one of more electronic components that emit heat during operation;
a support assembly to mechanically couple the housing to a body part of the user, wherein the support assembly includes at least a vapor-permeable contact layer having an inner surface positioned to contact the body part of the user and an outer surface positioned away from the body part of the user, and wherein the vapor-permeable contact layer has a first Moisture Vapor Transmission Rate (MVTR); and
a vapor-permeable spacer disposed at least partially between the outer surface of the vapor-permeable contact layer and the housing, wherein the vapor-permeable spacer is configured to be at least partially compressed, by the support assembly, between the housing and the body part of the user to maintain a position of the wearable electronic device with respect to the body part of the user, and wherein the vapor-permeable spacer has a second MVTR that is greater that the first MVTR.

19. The apparatus of claim 18, wherein the second MVTR is at least three times greater than the first MVTR.

20. The apparatus of claim 18, wherein the second MVTR is at least eight times greater than the first MVTR.

* * * * *